United States Patent [19]

Widmann

[11] Patent Number: 5,836,116
[45] Date of Patent: Nov. 17, 1998

[54] TANK SYSTEM

[76] Inventor: Roland Widmann, Bussenstrasse 40, D-88525, Dürmentingen, Germany

[21] Appl. No.: 615,195
[22] PCT Filed: Aug. 10, 1994
[86] PCT No.: PCT/DE94/00920
  § 371 Date: Jun. 6, 1996
  § 102(e) Date: Jun. 6, 1996
[87] PCT Pub. No.: WO96/05379
  PCT Pub. Date: Feb. 22, 1996
[51] Int. Cl.$^6$ .................................................. E03B 11/00
[52] U.S. Cl. ................................. 52/169.7; 52/1; 52/19; 52/169.1; 137/120; 137/122
[58] Field of Search ............................ 52/1, 19, 20, 21, 52/169.1, 169.6, 169.7; 137/120, 121, 122; 141/198

[56] References Cited

U.S. PATENT DOCUMENTS

| | | | |
|---|---|---|---|
| 924,834 | 6/1909 | Ross | 52/19 X |
| 1,475,120 | 11/1923 | Johnson | 137/120 |
| 1,562,693 | 11/1925 | Dill . | |
| 2,644,333 | 7/1953 | Duus | 137/120 X |
| 3,750,886 | 8/1973 | Salm | 210/111 |

FOREIGN PATENT DOCUMENTS

| | | |
|---|---|---|
| 371743 | 3/1923 | Germany . |
| 3010290 | 3/1980 | Germany . |
| 9308085 | 5/1983 | Germany . |
| 8514204 | 5/1985 | Germany . |
| 8522499 | 8/1985 | Germany . |
| 3819962 | 6/1988 | Germany . |
| 9007643 | 2/1990 | Germany . |
| 4202245 | 1/1992 | Germany . |
| 4227020 | 8/1992 | Germany . |
| 931330 | 4/1993 | Germany . |
| 682503 | 11/1990 | Switzerland . |

OTHER PUBLICATIONS

IKZ–Haustechnik, H.11 (1993), p. 46. Sanitar.

sbz, H5 (1992), p. 74, Sanitar, Schweitzer.

IKZ–Haustechnik, H.6 (1993), pp. 196–198, Sanitar, Waider.

Neue Deliwa–Zeitschrift, H.5 (1992), pp. 520–522, Eschborn.

Primary Examiner—Carl D. Friedman
Assistant Examiner—Kevin D. Wilkens
Attorney, Agent, or Firm—Dennison, Meserole, Pollack & Scheiner

[57] ABSTRACT

A tank system includes a tank, a rainwater feed mechanism and a run-off for contaminated water. The rainwater feed mechanism includes a switch unit that passes contaminated water to the run-off. When large quantities of rainwater are received, the switch unit passes the rainwater to the tank.

19 Claims, 6 Drawing Sheets

TANK SYSTEM

BACKGROUND OF THE INVENTION

The invention relates to a tank system comprising a tank, a rainwater intake, a run-off for contaminated water, a movable director unit having a delivery element for the directing of rainwater coming from the rainwater intake either to the run-off for contaminated water or to the tank, a sampling conduit which branches off the delivery element, and a water collecting container provided with an outlet, whose degree of filling determines the setting of the delivery element of the director unit.

Tanks for the collection of rainwater have been used for a very long time. With drinking water becoming in short supply and with increasing costs of treated water, the utilisation of rainwater and consequently the use of tanks is of increasing interest. This applies in particular to situations in which the use of rainwater which has not been treated or which has been only slightly treated is completely harmless, such as its use for washing machines, the flushing of toilets, car washes, the watering of gardens, etc. Nevertheless, it is an objective, with the use of tanks, that the water quality should be as high as possible.

A contamination of rainwater occurs as a result of contaminated collecting surfaces, such as roofs, because of airborne materials, dust, etc. With the onset of precipitation, the dust, etc. is initially washed off from the collecting surfaces and gathers, together with the rain, for example in the tank. The entrainment of solid particles cannot be completely prevented by the use of filters. Filters are generally ineffective against the passage of dissolved harmful substances and must be cleaned or exchanged from time to time.

For the rest, the use of rainwater retaining systems, such as are represented by the tanks, is advantageous for the setting up and operation of precipitation systems, because the water overflow associated with rainfall and which cannot be precipitated in the precipitation system but has to run off directly, is reduced by the use of tanks.

Since tank overflows are connected permanently with the sewerage system, and, just like the run-off water pipes, are flushed only in the case of excessive rainfall, they can lead to the reverse entry of micro-organisms or small animals.

It is also disadvantageous in the use of tanks that sediment settles on the bottom of the tanks and therefore a cleaning of the container is necessary from time to time.

From DE-U-85 22 499 there is known an apparatus for collecting rainwater with features as first mentioned above. The apparatus comprises a channel which is mounted pivotably approximately in the centre of its length, and from the centre of which there extends downwards an outlet of small cross-section. The initial, as yet unclean, rainwater is conducted through the outlet into a container for dirty water and after the flow of a predetermined amount of rainwater the channel is pivoted and the rainwater then flows into the container for usable water. It is disadvantageous with this apparatus that it requires a reversal of the direction of flow in the channel and the points in time of the changeover from the dirty water container to the usable water container, i.e. the switching points, are not clearly defined. Initially, residual dirt collects on the rainwater side, which then is flushed into the usable water container. Moreover, the apparatus is not suitable for collecting large amounts of water, because it has no clear separation of water paths. Furthermore, the apparatus is sensitive to dirt.

From DE-C-371 743 there is known an apparatus for the automatic collecting of rainwater which comprises a collecting container suspended by weights, a reservoir container guided in this with a closable base and an overflow, and also a storage container which is filled through the overflow. Initially, rain flows through the reservoir container and fills the collecting container. Thereafter, the bottom of the reservoir container is closed, which then fills with cleaner rainwater, which then flows through the overflow into the storage container. At the end of the rainfall the collecting container is emptied. With this apparatus there is the danger of a blockage by large particles. The switching over to the storage container is not carried out at a fixed switching point, so the movable parts come into contact with dirty water. Through the overflow of the reservoir container, in the case of very heavy rainfall, it can happen that, even at the beginning, rainwater flows directly into the storage container. The apparatus is comparatively complex with many components (containers, pipes) and is correspondingly maintenance intensive.

In DE-U-85 14 204 there is described a downpipe flap which is built into a downpipe for rainwater and which is provided to separate dirty rainwater and cleaner rainwater. At the beginning of rainfall, a suspended container which is connected to the flap is filled from the outlet and finally closes the flap so that the rainwater then flows into a collecting container. This can easily lead to blockage of the container outlet, so that a switchover is then no longer carried out and consequently all water is directed into the collecting container. If the rain is very heavy, this can likewise lead to rainwater flowing into the collecting container. Moreover, the switchover depends upon the frictional properties. The downpipe flap comprises a series of movable parts, for example even a spring, which is correspondingly sensitive and comparatively maintenance intensive.

The described known arrangements all have the feature that the switching to run-off is not accurately established and that water can run off without precision.

It is the object of the invention to create a tank system in which as little as possible harmful material is carried into the tank and is deposited there.

SUMMARY OF THE INVENTION

A tank system according to the invention comprises therefore a tank, a rainwater intake, and a run-off for contaminated water. A movable director unit having a delivery element is provided for directing the rainwater coming from the rainwater intake either to the run-off for contaminated water or to the tank. A sampling conduit branches from the delivery element or already from the intake. Moreover, a water collecting container provided with an outlet is provided, the degree of filling of which determines the setting of the delivery element of the director unit. According to the invention, the inlet end of the sampling conduit is arranged at a shallow angle to the general direction of flow in the delivery element.

The tank system of the invention preferably comprises a mechanically operating switching mechanism, which directs the initial water containing dirt directly into the run-off system, and which only permits the flow into the tank after the passage of a predetermined amount of rainwater. This means that only a small number of components are required, so that the assembly cost and maintenance cost is small. Also, the system is not very sensitive to dirt and consequently has little likelihood of being damaged. Moreover, it is insensitive to the quality of the flow, since it only consists of mechanical parts. Also, the system is adaptable to different roof surfaces. This is possible with little adjustment cost.

The components of the system of the invention can be manufactured at favourable cost from corrosion-resistant materials, e.g. the pipes and parts of the switching unit can be made from copper or VA-steel, or alternatively from plastics material. The whole tank or further parts of the tank system can be made of plastics material or metal, and the materials can be combined in any way.

The switching unit of the invention consisting of the movable director unit with the tubular or channel-type delivery element, the sampling conduit and the water collecting container provided with an outlet, makes possible the establishment of an unequivocal switching point. Upon the beginning of rainfall, the rainwater which initially contains dirt washed from the surface is directed into the sewerage system. At the same time, a proportion of the water when flowing in sufficient quantity in the director unit is branched off into the delivery element and is directed into the water collecting container. When this is filled with a predetermined quantity of water, a switching process is triggered, as a result of which the delivery element is reset. This reduces the spacing x and further rainwater is then directed into the tank.

In the rainwater intake a throttling/damping device such as a flap can be provided, in order to achieve a regular onward flow. Preferably, with the switching unit provided according to the invention, it is always the case that the flow of the rainwater in the director unit is free and without obstruction and that the bypass or sampling flow for the water collecting container is effected without any turbulence. The water flow in the sampling conduit takes place practically without any change of the flow direction and in practice almost horizontally. In this way a defined onward flow and bypassed quantity is given, with the branching off being taken from the water flow and not from the bottom of a conduit and the like with its consequential possibilities of contamination. In practice, any quantity of water can be redirected. A possibility of adjustment in relation to for example the roof area can be provided for by changing the setting of the sampling conduit. Furthermore, different sampling levels can be provided for, in order to achieve maximum water utilisation and ensure optimum control of the switchover.

In the tank system of the invention, the water collecting container is preferably pivotable for example by means of a yoke, and/or is coupled to the pivoting of the director unit. In this way the mechanical switching unit comprises few parts and is directly acting.

Preferably, in order to measure the degree of filling of the water collecting container and to establish the switching point, an auxiliary weight is provided. When the weight of the water provided in the water collecting container corresponds to the auxiliary weight, then a switching process is triggered. The weight makes possible a simple adjustment of the switching point. Otherwise, one has to change the possibly adjustable outlet cross-section of the water collecting container, or the tube cross-section of the sampling conduit, or a suspension of the movable director unit provided for this.

If the rainfall is small (drizzle, precipitation from fog, etc.) and consequently generates no washing effect, then because of the spacing x between sampling conduit and delivery element, no water is supplied through the sampling conduit to the water collecting container. Even with heavier rainfall, but always small in volume, water introduced through the sampling conduit flows through the water collecting container, i.e. flows out again from it, without the container filling. The rainwater is therefore in both cases directed into the sewerage system. If such small rainfall follows on from a previously heavier rainfall, by appropriate dimensioning of the outlet crosssection, the time up to switching back is so chosen that the short-term rain interruptions do not lead to a switching back and so that the received rain is supplied optimally to the store.

Preferably, the water collecting container has a cover which prevents a splashing over of water on filling and after the switching process.

In a preferred embodiment of the tank system of the invention, the inlet of the sampling conduit is arranged at a, preferably adjustable, spacing from the bottom of the sampling conduit. If then the director unit is pivoted for example in the direction of the sampling conduit, this can according to one embodiment of the invention bring it in practice into contact with the bottom of the director unit. This makes it possible, even with later, reduced rainfall, to direct further water to the water collecting container and in this way to ensure a further filling of the tank.

Preferably, the movable director unit and the sampling conduit are adjustable in relation to one another and/or individually (spacing x). Any lesser rainflow does not then reach the sampling conduit, which thus is kept free from very strongly contaminated rainwater. Scarcely any water flows into the water collecting container in such cases where there is insufficient washing effect. Furthermore, it can be advantageous to provide a valve in the sampling conduit, which makes possible a control of the quantity of water which is diverted.

In this way, with a tank system according to the invention, one always ensures that rainwater is only directed into the tank when sufficiently heavy and sufficiently lengthy precipitation takes place.

In order to provide a division between the run-off for contaminated water and a feed supply to the tank, there is preferably provided a separating edge, so that unequivocal run-off conditions for the rainwater are always present.

Likewise, according to a preferred embodiment of the invention, the movable director unit can be in engagement with a trip cam which establishes the two settings for the delivery element and provides a sharp switching characteristic.

Preferably, a float is provided in the tank, which is coupled to the water collecting container and/or to the movable director unit or the delivery element. By means of the float one can ensure that with an already full or about to be filled tank a supply of water into the tank is not possible or is no longer possible, because the director unit has not switched over or switched back and all further rainwater is directed into the sewerage system. This makes a tank overflow superfluous.

Furthermore, with the tank system according to the invention, it can be advantageous to make the bottom of the tank extending as an inclined surface, as well as providing at least an animal guard, mesh and/or filter for the outlet. This means that there is less contamination of the bottom of the tank or that this is concentrated into a particular region, so that the cost of cleaning is reduced. Likewise, the entry of small animals into the tank can be prevented additionally by meshes. Basically however, with the tank system according to the invention, no filters, meshes and therefore any consequential cleaning and maintenance work is necessary. Sediment and the like can be siphoned from the bottom of the tank by means of a lifting tube provided suitably with a pump. A complete separation from the run-off water is therefore ensured.

Preferably, a pump can be provided in the tank with minimum disruption, so that no in-house installation is necessary. Furthermore, by means of tube separators, the feeding of emergency water (usable water) into the system is provided for. Only a small additional cost is necessary for this.

With the tank system according to the invention, one can also provide one or more switch units separate from the tank, consisting of a movable director unit with a delivery element, a sampling conduit and a water collecting container provided with an outlet. With this arrangement, different or very large roof surfaces or areas, possibly with different spatial orientations, can be utilised separately and account can be taken of different quantities of rainwater received from the respective surfaces. It can also be arranged that the water is directed into several tanks.

With the tank system according to the invention, the first part of the rainwater received from the collecting surfaces is used to perform a flushing of the run-off water system and of the conduits connected thereto. The rainwater coming from the collecting surfaces cleaned by the action of the rainwater is then directed wholly into the tank. By means of the exactly defined cleansing effect according to the invention, the quality of the collected water is extraordinarily high without having to use expensive filter systems or the like.

The system according to the invention can be sunk into the ground to provide security against frost. This also means that there is no adverse visual impact.

The structure of the tank system according to the invention is modular and comprises for example combinable, modifiable modules of tank, switching unit or units, switch-off device (float), separating device, pump system.

The invention will now be described in more detail by reference to two embodiments of a tank system which are given by way of example and with reference to the drawings. The description serves to illustrate the invention and is not to be regarded as limiting the invention.

DESCRIPTION OF THE PREFERRED EMBODIMENTS

In the following there is now described a first embodiment of a tank system in accordance with the invention, with reference to FIGS. 1 to 4.

Figure 1:
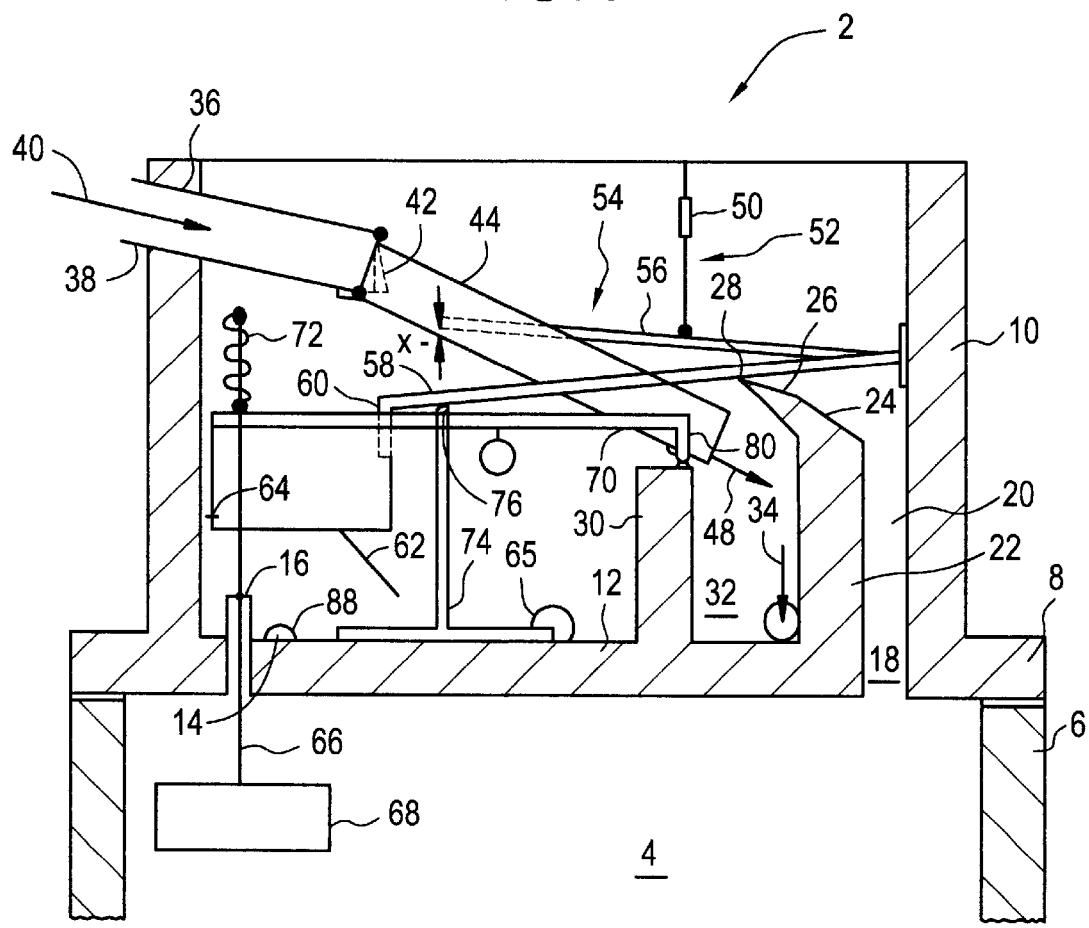
FIG. 1 is a schematic sectional view of an assembly with a switching unit on a tank, according to a first embodiment of the invention, where the switching unit is in a setting for incoming water to be directed into e sewerage system.

FIG. 1 shows, in section, an assembly 2 of a tank system which is set upon an underground tank 4 which is shown only in a schematic way, i.e. set on its brick or concrete wall 6. The assembly 2 is likewise of concrete with a wall 10 provided with an outer flange 8 sitting on the concrete wall 6 of the tank 4. The base 12 of the assembly 2 extends in the same plane as the outer flange 8, while its cover is not shown. In the base 12 there is provided an aperture 14 with a stop 16 arranged thereon, which will be described later. Additionally, a zone 18 for a supply inlet 20 into the tank 4 is hollowed out (see arrows 21, 23). One boundary of the zone 18 and of the supply inlet 20 is formed by the wall 10, and the other boundary is formed by a dividing wall 22. The dividing wall 22 is angled (24, 26) sharply away from the boundary wall 10 at the upper end, and terminates in a separating edge 28. Spaced from the dividing wall 22 and at a further distance from the wall 10 is arranged a further, somewhat lower wall 30 which, together with the dividing wall 22, forms a well 32. The walls 22 and 30 can be formed as separate components made of a different material, for example sheet metal, plastics. They can then sit for example in guide grooves in the base 12 and in the wall 10, with appropriate seals being provided. A run-off pipe 34 leading to the sewerage system is disposed at the bottom of the well 32.

At the upper left in FIG. 1 there is shown a hole 36 in the wall 10 which is provided as a through-way for an inclined intake pipe 38 for collected rainwater. The direction of flow is indicated by an arrow 40. In order to calm the flow, a flap 42 or another flow calming member is provided at the end of the intake pipe 38. A delivery pipe 44 which is connected pivotably to the intake pipe 38 and serves as a director unit is pivotable by means of a hinge 46. In the setting shown in FIG. 1, the delivery pipe 44 issues into the sewerage well 32 (see arrow 48) and the rainwater flowing therethrough is delivered by means of the run-off pipe 34 into the sewerage system.

On the tank cover which is not shown there is fitted a flexible height adjusting device and suspension means 50, 52 for a sampling conduit 54 by means of which water from the flow passing through the delivery pipe 44 can be extracted. The sampling conduit reaches into the delivery pipe 44 which is provided with a suitable hole in the top, and terminates at an acute angle at a spacing from the bottom of the delivery pipe. The spacing can be adjusted by means of the aforesaid height adjustment device 50, in order to be able to vary the amount extracted. A further possibility for adjustment can be provided, with the sampling conduit being designed as a telescopic tube and its length being variable. The sampling conduit 54 is divided into several sections, a sampling section 56, a transversely extending retaining section 59 which is fixed to the wall 10, an issuing section 58 extending parallel to the sampling section 56, and an outlet section 60. The outlet section 60 reaches into a movable, i.e. pivotably arranged, box-like water collecting container 62. The issuing section 58 and the outlet section 60 can be formed as hoses and then can be connected to the watertight water collecting container 62.

Figure 6:
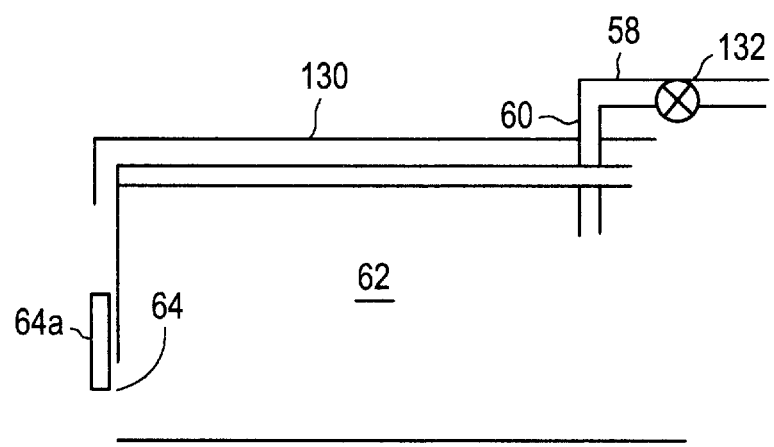
FIG. 6 is an enlarged view of a portion of FIG. 1.

The water collecting container 62 is provided with a cover 130 shown in FIG. 6 and through which is guided the outlet section 60 of the sampling conduit 54. A hole 64 serves for the emptying of the water collecting container and is so dimensioned that a predetermined amount of water will flow out in a given period of time. The hole 64 may have a variable cross-section with size controlled by an element 64a. A valve 132, shown in FIG. 6, can be provided in addition. The outflowing water flows through a run-off 65 into the sewerage system.

Figure 2:
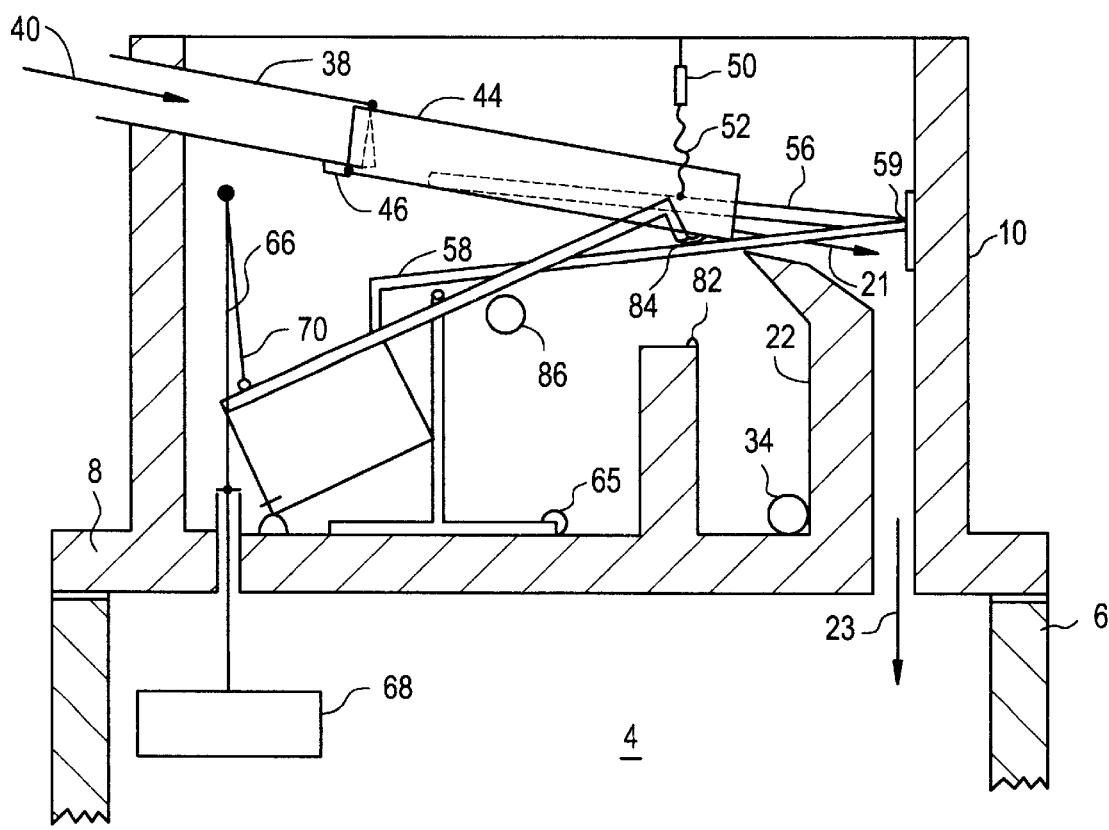
FIG. 2 is a schematic vertical sectional view of the structure of FIG. 1, in which the switching unit is shown in a setting for incoming water to pass into the tank.

A lifting rod 66 extending through the tubular stop 16 and connected to a float 68 located in the tank 4 is connected by means of a flexible coupling 70 to the water collecting container 62. The coupling is such that the float 68 lifts the water collecting container 62 into the upper position, which is shown in FIG. 1, with a high water level in the tank 4. In this position the flexible coupling 72 is not under stress. If the water collecting container 62 is located instead in the bottom position, as shown in FIG. 2, the flexible coupling 72 is stressed or stretched. As has already been explained, the upper position of the water collecting container 62 has the result that the inflowing rainwater is directed totally into the sewerage system.

The water collecting container 62 is fixed at one end of a pivotable yoke 78 which is suspended by means of a linkage 76 from a support frame 74. In FIG. 1 the yoke 78 is shown located in the horizontal position, and its other end with downwardly extending end portion 80 rests on a damping buffer 82 on the wall 30 and is located in addition in contact with the pipe-end side of a trip cam 84. The yoke 78 supports, on the other side of the support frame 74 in relation to the water collecting container 62, an auxiliary weight 86 which is provided for changing the trip point as will be described in more detail later, and which can be exchanged simply or changed. Below the water collecting container 62 there is a further damping buffer 88 on which the water collecting container 62 comes to rest in the bottom position as shown in FIG. 2.

When the water collecting container 62 is located in the bottom position as shown in FIG. 2, the yoke 78 is pivoted upwards at the other end and comes into contact with the underside of the delivery pipe 44 on the other side of the trip cam 84. In this position the inlet end of the sampling conduit 54 lies in contact with the bottom of the delivery pipe 44, which is held pivoted upwards by the yoke 78. In this position, the delivery pipe 44 extends in the illustrated embodiment in substantially the same direction as the intake pipe 38 and terminates above the separating edge 28 so that the outflowing water flows into the supply inlet 20 and into the tank 4.

The switchover between the two positions shown in FIGS. 1 and 2 is effected in the manner now to be described. Upon the commencement of precipitation the whole arrangement is located in the position shown in FIG. 1. The as yet contaminated rainwater is directed by means of the run-off pipe 34 into the sewerage system. A small amount of water reaching in excess of the spacing x is bypassed through the sampling conduit 54 and flows into the water collecting container 62. As long as the amount of precipitation is small, the water flows out of the container again through the hole 64, without the container becoming filled. However, if the precipitation is greater, the weight of the water collecting container 62 increases with an increasing amount of collected water, until the yoke 78 is pivoted up. A more accurate pivot point or trip point is made possible by the trip cam 84 on the delivery pipe 44, which establishes the yoke position exactly. Likewise, by means of the separating edge 28, an accurate separation of the water supply between the sewerage system and the tank is possible. With the yoke 78 pivoted up, the rainwater runs through the supply inlet 20 into the tank 4. Additionally, any water passing through the sampling conduit 54 is directed into the water collecting container 62. If the amount of precipitation is sufficient or if it increases again in time before the emptying of the water collecting container 62, the yoke remains in the upper position and the tank 4 is filled. If the amount of rainfall is no longer sufficient, a tripping again takes place and the water collecting container 62 then again adopts its lower (sic) position, in which the water flows from the delivery pipe 44 into the sewerage system.

Figure 3:
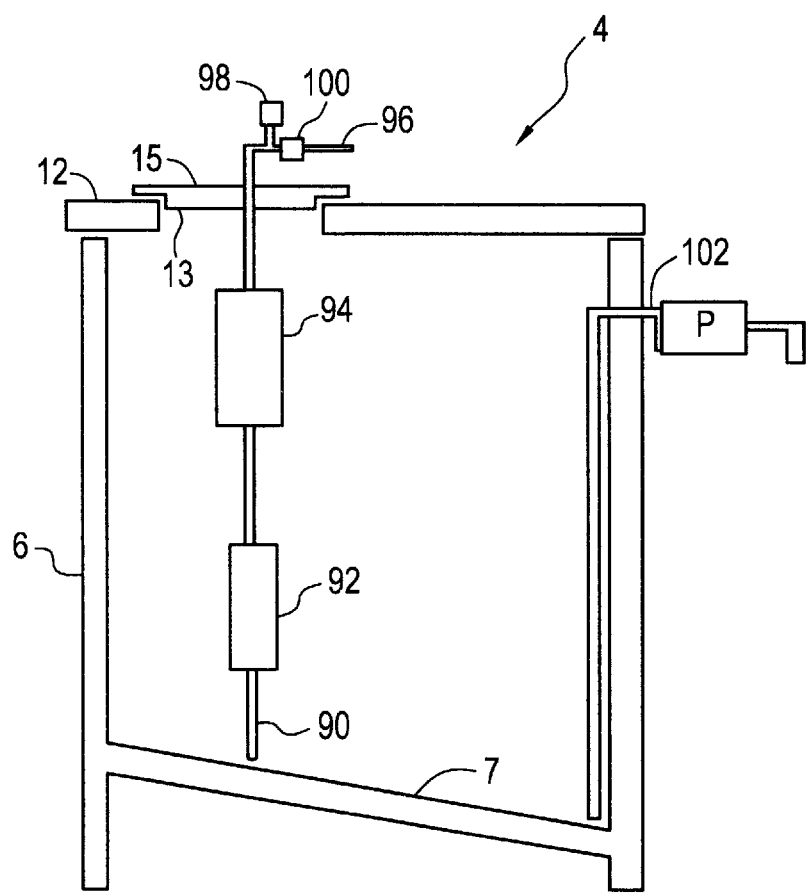
FIG. 3 is a schematic sectional view of a tank according to the first embodiment.

FIG. 3 shows a sectional view of the tank 4. In the base 12, which covers the tank, there is provided an opening 13 as access for cleaning and maintenance work. The opening 13 is closed by a cover 15 (manhole cover). In the tank 4 is fitted the pump/water supply system. This includes a suction pipe 90, a pump 92, a pressure reservoir 94 and a water supply pipe 96 which leads to the house. The water supply pipe 96 is provided with a pressure switch 98 and a non-return valve 100. These components are fitted in the usual way and therefore do not need to be described in greater detail. Because of the external arrangement of the pump/water supply system, an installation in the house is superfluous and all maintenance and cleaning work can be carried out in situ.

The bottom 7 of the tank 4 is inclined, so that a concentration of the unavoidable suspended matter collects at the lowest point. In this way, these and similar undesirable constituents of the tank water can be sucked out, for example by means of a suction tube 102. The vertical length of the suction tube 102 outside the tank 4 determines how much water is sucked out when fully filled and how great is the additional cleaning effect associated therewith.

The sediment lifting tube 102 can also be provided with a pump P whose start-up times and running periods can be made dependent on different selectable parameters. In this case the passage of the sediment lifting tube through the container 4 is superfluous, because the water can be pumped directly into the sewerage well 32. Consequently, a complete separation from the run-off water system is guaranteed.

Figure 4:
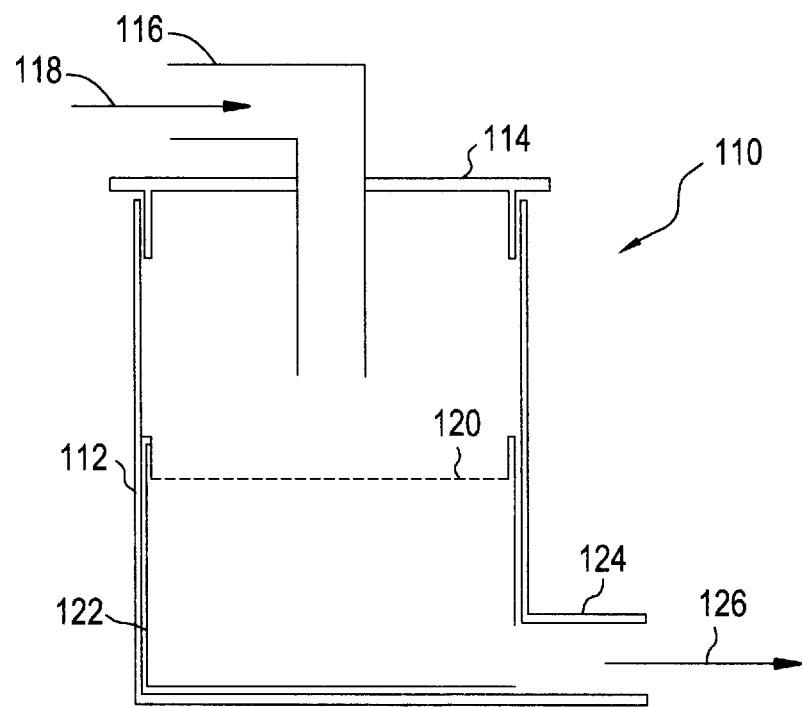
FIG. 4 is a schematic sectional view of a separating device which separates the tank from the run-off water system.

FIG. 4 shows a sectional view through a separating device 110 which is built into the pipe leading from the tank 4 to the sewerage system and which serves to prevent the ingress of small animals. The device comprises a housing 112 of concrete with a cover 114 which is rotatable in order to be independent of the output. Water entering the tubular separator 110 through an inlet pipe 116 (see arrow 118) flows through a mesh 120 which serves as a creep barrier for small animals such as mice for example. The inlet pipe 116 and the mesh are made for example of copper or a bactericidal, fungicidal or viricidal material. An insert 122 arranged below the mesh 120 and which is open to the outlet 124 (see arrow 126) is also made of such material. The separator device 110 prevents a migration of micro-organisms and of animals in the direction towards the tank, which could impair the water quality.

Figure 5:
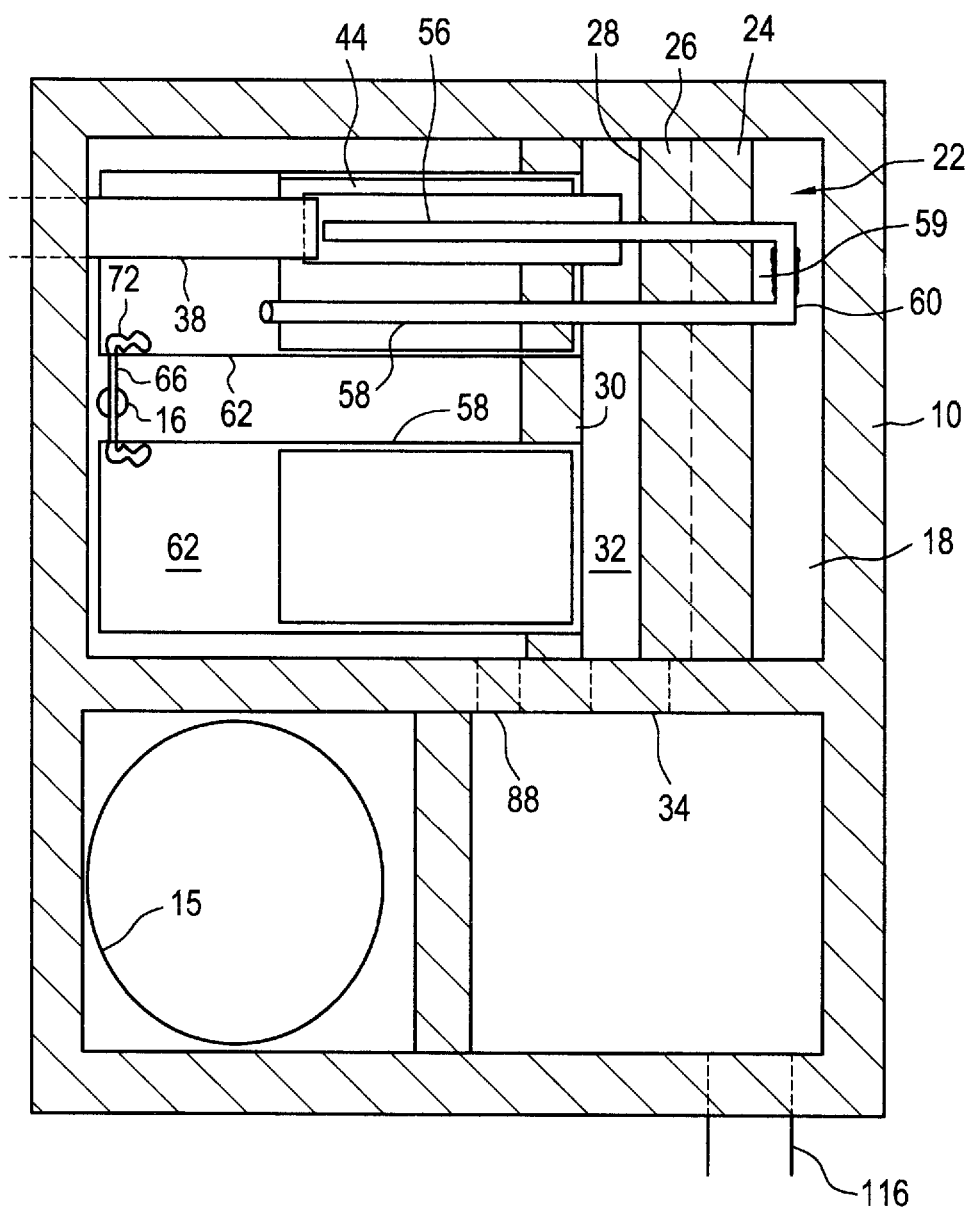
FIG. 5 is a schematic horizontal sectional view of a tank system according to a second embodiment of the invention, having two rainwater intakes.

FIG. 5 shows a second embodiment of a tank system in accordance with the invention. This only differs from the first embodiment which has already been described above in that two trip units are provided, in order to be able to feed rainwater from two differently positioned and contaminated collecting surfaces in dependence upon the degree of contamination and the amount of rainwater flowing off the respective surfaces. Otherwise, all the components are the same and are therefore identified by the same reference numerals. The trip units are adjusted for different first running into the sewerage system, in order to take into account different circumstances.

I claim:

1. Tank system comprising:
   a tank;
   a run-off for contaminated water;
   a rainwater intake means;
   a delivery element in flow communication with the rainwater intake means and defining therewith a direction of water flow, the delivery element being movable between a first position in flow communication with the tank and a second position in flow communication with the run-off;

a sampling conduit having an inlet end in flow communication with the delivery element and arranged at a shallow angle to the direction of flow, for diverting a portion of water flowing therethrough;

a water collecting container in flow communication with the sampling conduit, and including an outlet; and director means for moving the delivery element between the first and second positions depending on an amount of water in the water collecting container.

2. Tank system according to claim 1, wherein the tank includes a float means therein which is coupled to the water collecting container.

3. Tank system according to claim 1, wherein the tank includes a float means therein which is coupled to the director means or to the delivery element.

4. Tank system according to claim 1, wherein the delivery element is a pipe or a channel.

5. Tank system according to claim 1, wherein the delivery element and the sampling conduit are arranged to be adjustable in relation to one another.

6. Tank system according to claim 1, wherein a valve is provided in the sampling conduit.

7. Tank system according to claim 1, wherein at least one of the delivery element and the sampling conduit is suspended.

8. Tank system according to claim 1, wherein a separating edge is disposed between the first and second positions, which ensures a separation between the water flowing to the run-off and the tank.

9. Tank system according to claim 1, wherein the director means is in engagement with a trip cam which establishes the first and second positions.

10. Tank system according to claim 1, wherein the water collecting container is pivotable or the delivery element is pivotable and the water collecting container is coupled thereto.

11. Tank system according to claim 1, wherein the inlet of the sampling conduit is arranged at a defined distance (x) from a lowermost portion of the delivery element.

12. Tank system according to claim 1, wherein the director means includes an auxiliary weight for establishment of a point at which the delivery element moves between the first and second positions.

13. Tank system according to claim 1, wherein the outlet of the water collecting container is adjustable in cross-section.

14. Tank system according to claim 1, wherein the water collecting container includes a cover.

15. Tank unit according to claim 1, wherein the director means, delivery element, sampling conduit and water collecting container together form a switch unit, and at least one said switch unit is provided separate from the tank.

16. Tank system according to claim 1, wherein the tank includes a bottom portion which is inclined.

17. Tank system according to claim 1, additionally comprising a lifting tube disposed in the tank and a pump connected thereto, for siphoning of sediment from the tank.

18. Tank system according to claim 1, wherein at least one of an animal barrier, mesh and filter is provided at the run-off.

19. Tank system according to claim 1, wherein the system is modular in construction.

* * * * *